Jan. 31, 1933.  A. C. RUSH  1,895,734
TRIADIC, INTERLOCKING STRUT AND TRUSS, CATENARY, AND SUSPENSION BRIDGE
Filed April 27, 1927   5 Sheets-Sheet 1
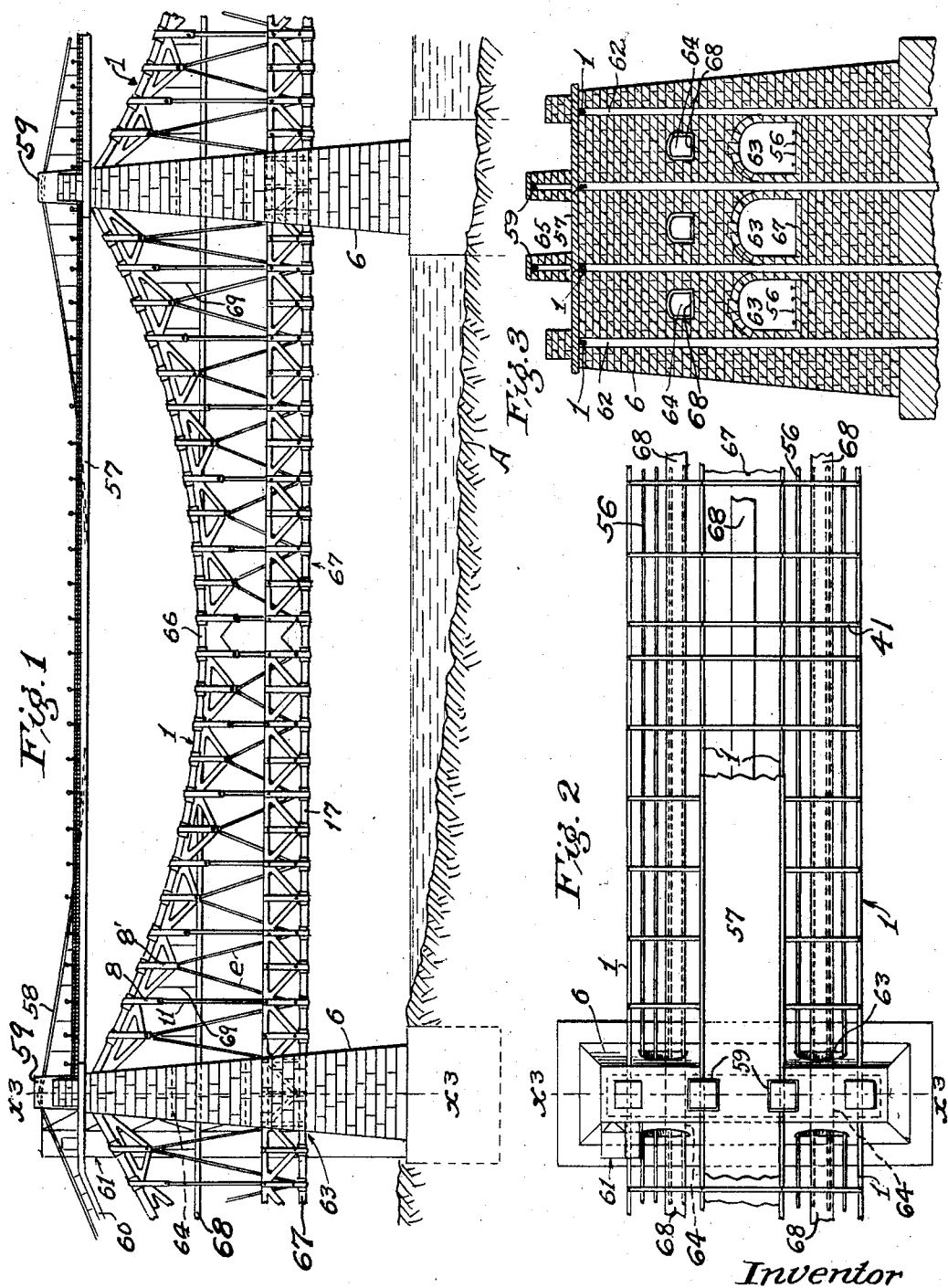
Witness
C. C. Holly
Inventor
Allan C. Rush
by James R. Townsend
his atty

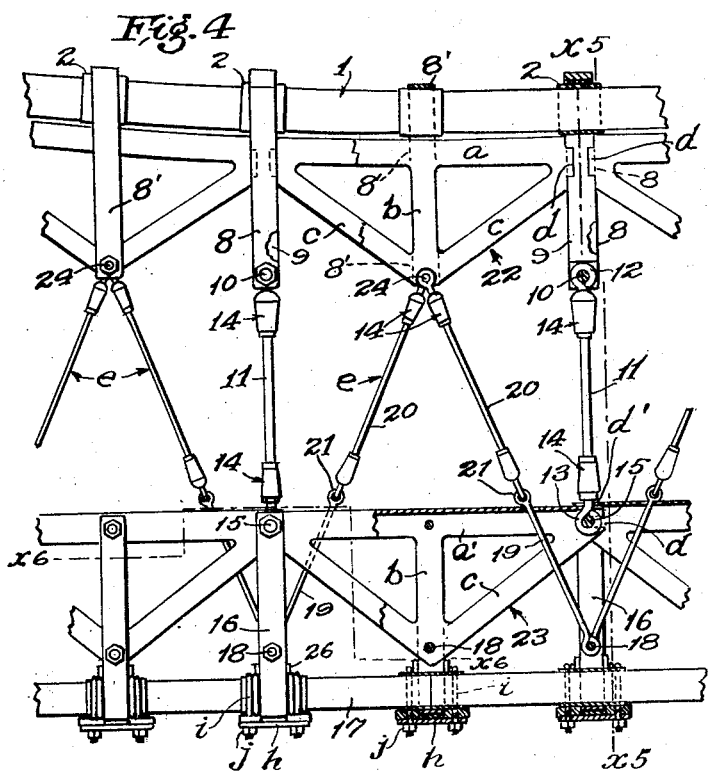
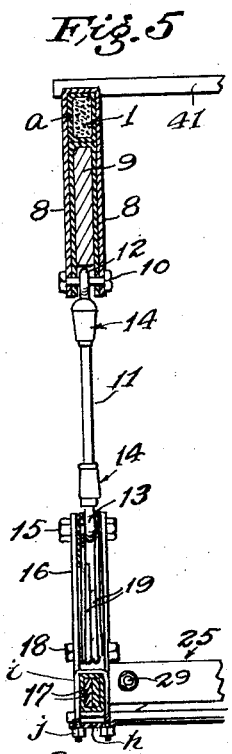
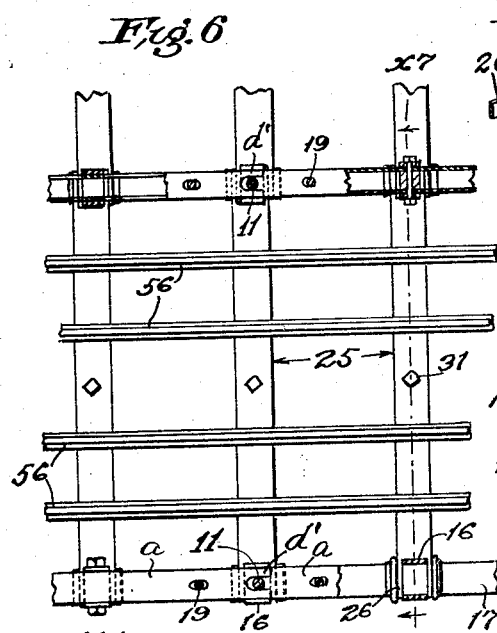
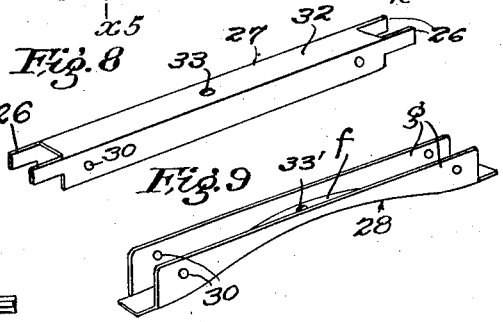
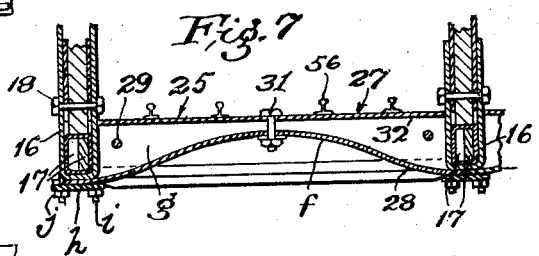

Jan. 31, 1933. A. C. RUSH 1,895,734
TRIADIC, INTERLOCKING STRUT AND TRUSS, CATENARY, AND SUSPENSION BRIDGE
Filed April 27, 1927 5 Sheets-Sheet 3
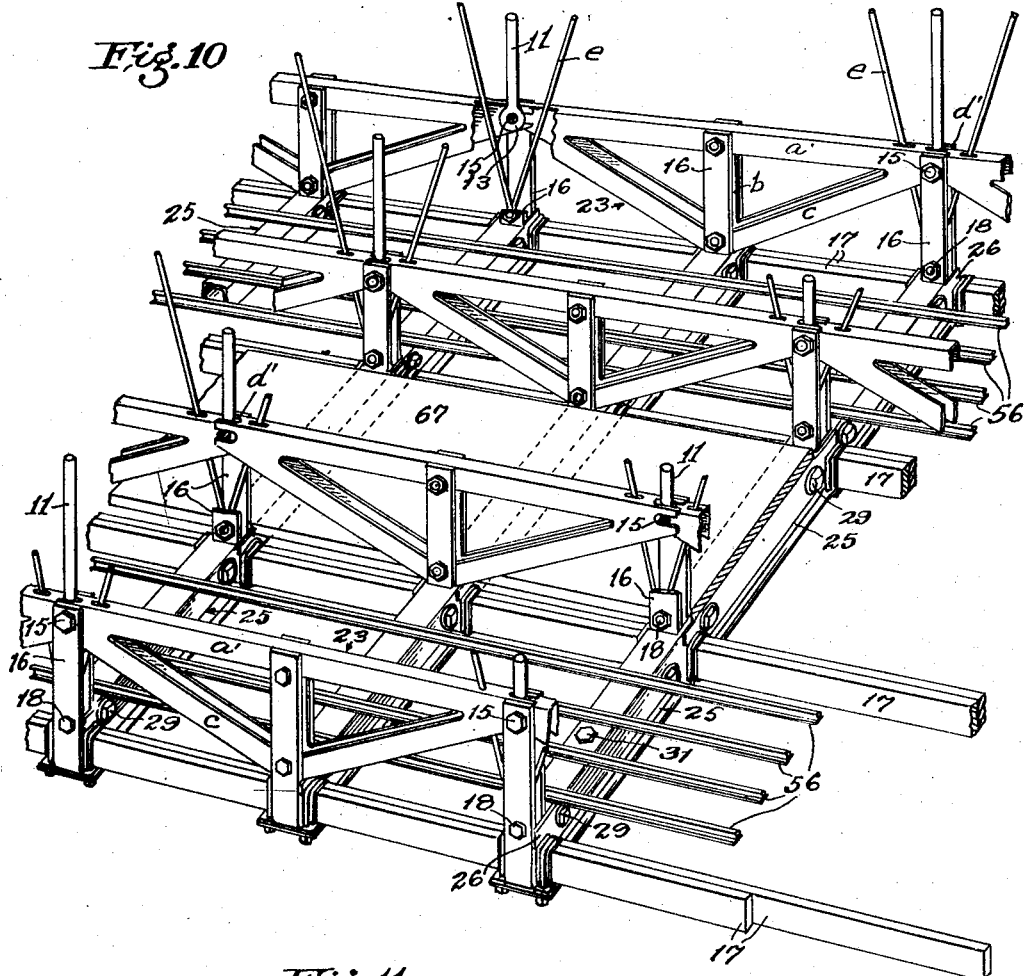
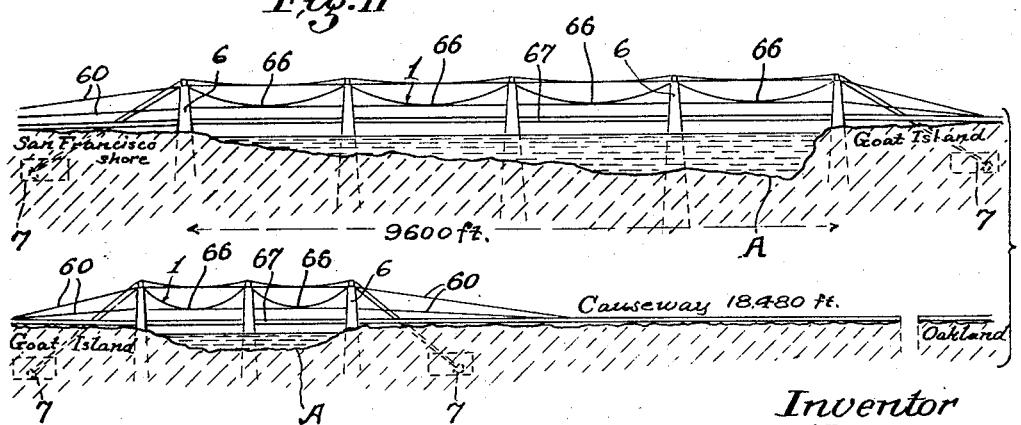
Witness
C. C. Holly
Inventor
Allan C. Rush
by James R. Townsend
his atty

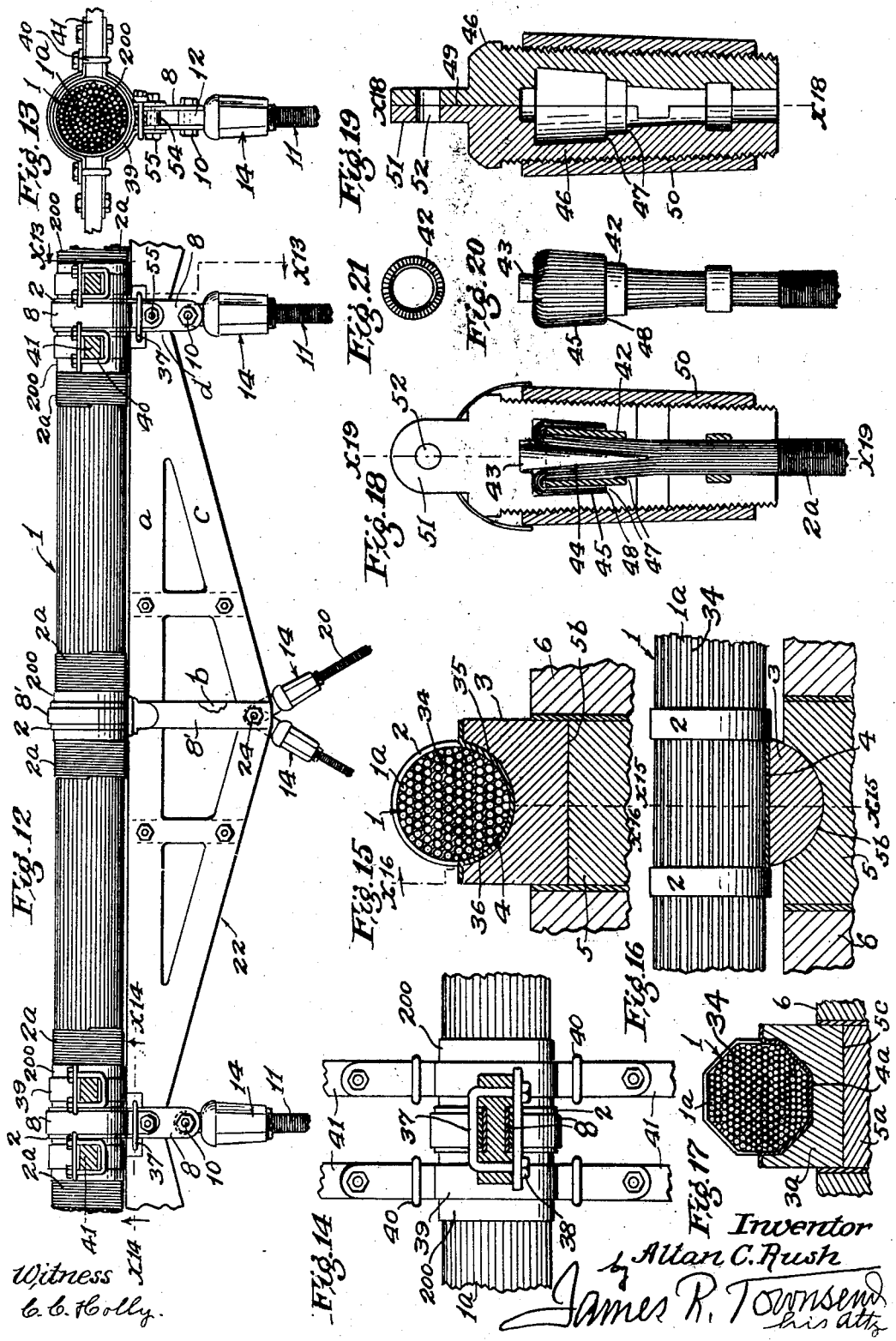

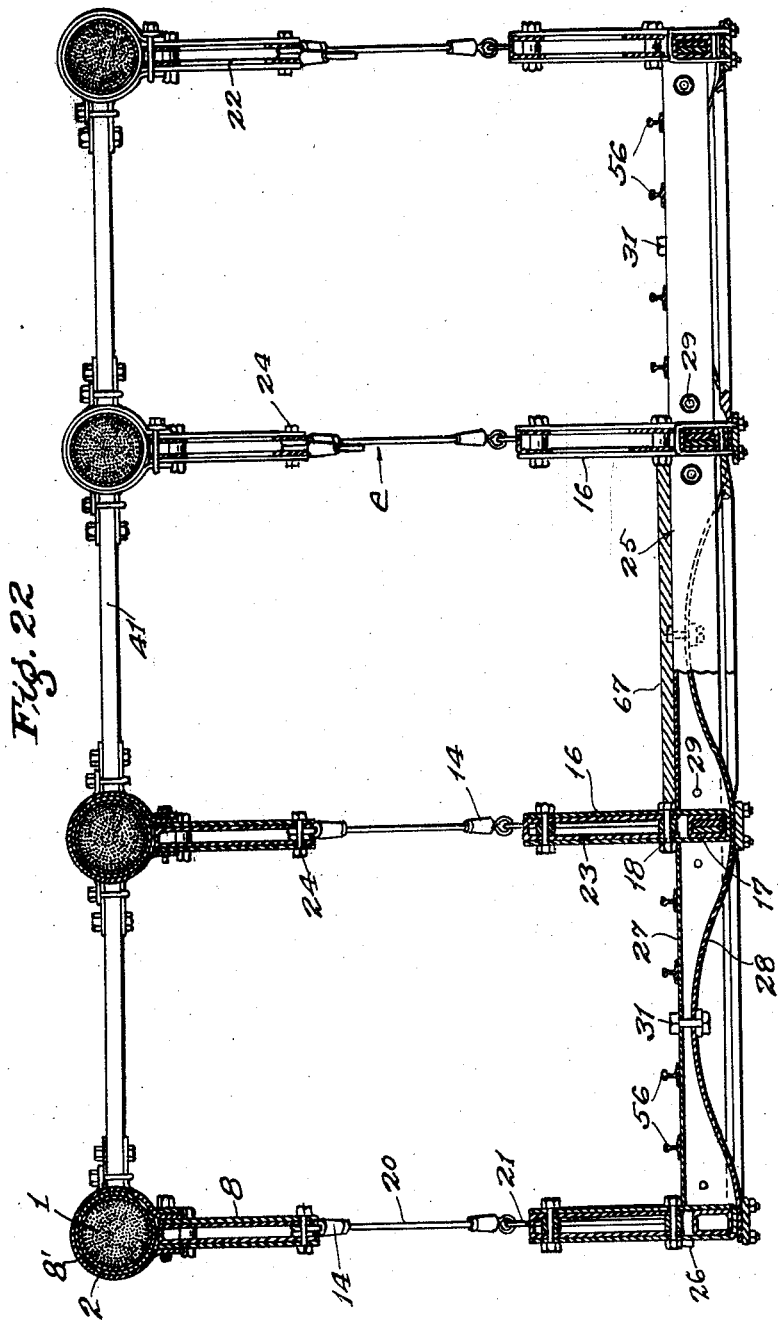

Patented Jan. 31, 1933

1,895,734

UNITED STATES PATENT OFFICE

ALLAN C. RUSH, OF LOS ANGELES, CALIFORNIA

TRIADIC, INTERLOCKING STRUT AND TRUSS, CATENARY, AND SUSPENSION BRIDGE

Application filed April 27, 1927. Serial No. 187,096.

This invention relates to a bridge which employs a steel wire cable forming a catenary supported by piers; and to this extent resembles the support fundamental to the suspension type of bridge.

Objects are to so dispose the bridge materials as to minimize the strain upon any particular part of the structure; to distribute the weight of the loads passing over the bridge, and to absorb the shocks caused by such passage.

The invention includes a novel construction and arrangement whereby passageways at three levels are provided at minimum cost, and afford improved facilities for travel across broad spaces.

In carrying out this invention, I employ appropriate practically solid and rigid supports as piers of masonry, cement, concrete, or other material, reinforcing and reinforced by steel construction; and an object of the invention is to secure maximum service from such piers with minimum strain, and with maximized load carrying and traffic accommodating qualities.

A broad feature of novelty resides in an arrangement of struts secured to the undersides of the catenary loops and constructed and arranged to strengthen the catenary, to hold the suspension in true position, to accommodate expansion and contraction, to distribute the loads to the catenary and to serve as a shock absorber.

An object of the invention is to provide means whereby ways for the heavy traffic shall be supported by load carriers spaced apart from, and constructed and arranged relatively low, and suspended from and connected to the heavy catenaries so as to absorb shocks caused by the passage of loads over the way; and this I do by interlocking triadic rocker truss beams yoked to the catenaries and articulated with each other to afford such lost motion as may be required to absorb shocks and prevent destructive or otherwise objectionable vibrations; and to counteract any accumulated alterations of compressions and extensions in limited zones of the catenary; and to accommodate movements resulting from heat and cold expansion and contraction, from wind pressure, and from other physical forces.

An object is to insure a required spacing of the suspension means along the catenary and yet to afford a shock absorbing flexibility combined with a practical inertial and articular character that prevents extensive transmission of motion throughout the bridge or to the supporting cables.

I utilize the piers to a high extent by means of a light cable catenary suspended from top to top of the piers, and support thereby a footway and pleasure and prospect platform; and the same may be connected to the intermediate way by stays.

The sills and sill supports are held rigidly in parallelism by cross beams of special construction which are also embodied in and form parts of this invention.

It is to be understood that I do not limit the invention to a structure including all the features herein set forth as constituting the completed bridge; the invention includes not only the combination and sub-combinations herein described, but also various parts and arrangements of parts hereinafter described and claimed.

Objects are economy of time, labor, and material employed in construction; avoidance of crystalizing action; ease of replacing parts; and freedom from destructive strains and molecular changes due to expansion, contraction and vibration, or other disruptive alternation in the application of forces.

The invention includes the bridge as a whole and various structural elements and parts and combinations of parts hereinafter set forth.

An object is superior safety from accident to builders and users.

Other objects, advantages and features of invention may appear from the accompanying drawings, the subjoined detailed description and the appended claims.

The accompanying drawings illustrate the invention.

Figure 1 is a fragmental side elevation of a bridge constructed in accordance with this invention; and shows a span supported by a shore pier and a channel pier; fragments of an approach and a second span are also shown.

Fig. 2 is a fragmental plan of a part of Fig. 1.

Fig. 3 is a sectional elevation of one of the piers on line $x3$, Figs. 1 and 2.

Fig. 4 is a fragmental detail illustrating in broken side elevation, the combination of supporting cable and load carriers, with double cantilever rocker strut trusses.

Fig. 5 is a fragmental sectional view on line $x5$, Fig. 4, of one of the cantilever struts and its connection with the cable and stringer. A cable of oblong cross section is shown.

Fig. 6 is a fragmental plan partly in section at different elevations on irregular line $x6$—$x6$, Fig. 4, showing part of a double track roadway.

Fig. 7 is a fragmental cross section on line $x7$, Fig. 6, of the roadway.

Fig. 8 is a perspective view of the top beam of the girder shown in Fig. 7.

Fig. 9 is a perspective view of the brace member of the girder shown in Fig. 7.

Fig. 10 is a fragmental perspective of the lower truss and floor construction of one individual load carrier and fragments of adjacent individual load carriers for a three-way bridge.

Fig. 11 is a fragmental diagrammatic illustration of a bridge of numerous spans for construction in accordance with this invention across the channels and Goat Island at the Bay of San Francisco.

Fig. 12 is a fragmental detail showing an upper cantilever strut of elongate form, and its articulations and connections, and a round cable supporting the same; the strut being canted slightly so that the right hand end is up against the catenary and the other end is depressed, thus indicating a possible relative deflection of the strut.

Fig. 13 is a transverse section on irregular line $x13$—$x13$, Fig. 12.

Fig. 14 is an inverted plan of a hangar support and fragments of stays on a fragment of a round cable. The support is in section on line $x14$—$x14$, Fig. 12.

Fig. 15 is a sectional detail of a round cable and its supporting rocker saddle in section on line $x15$—$x15$, Fig. 16.

Fig. 16 is a fragmental elevation in section on line $x16$—$x16$, Fig. 15, showing the cable on its pillow block rocker mounted on a pier-supported cradle.

Fig. 17 is a fragmental sectional view analogous to Fig. 15 with an octagonal cable in place.

Fig. 18 is a fragmental sectional detail on line $x18$—$x18$, Fig. 19, of a hanger-cable end holder with hanger-cable end therein.

Fig. 19 is a section on line $x19$—$x19$, Fig. 18.

Fig. 20 is a fragmental detail of a hanger-cable end ready for engagement with the cable end holder.

Fig. 21 is a view of the hanger-cable wire-spacing sleeve looking at the outer end.

Fig. 22 is an enlarged fragmental vertical section on line indicated at $x22$—$x22$, Figs. 4 and 12.

Arrows on the section lines indicate the direction of sight.

Different forms of catenary cable are shown in various views and it is understood that the invention is not limited to any particular form. In the drawings the diameters of the catenary cable wires are exaggerated as compared to the diameter of such cables, and the invention is not limited to exact proportions.

The catenary cables 1 may be of any required number and of any suitable construction, size and cross-sectional form; and in the bridge structure illustrated, there are four catenary cables. Round or octagonal cables are preferred as indicated in Figs. 12, 13, 14, 15 and 16; and such cables, respectively, may contain approximately the same number of wires.

The cables are shown supported by steel rockers as at 3, in Figs. 15 and 16, and $3a$ in Fig. 17, and each cable supporting rocker is provided with a seat as shown at 4 in Figs. 15 and 16, and $4a$ in Fig. 17; and said rockers are supported by pillow blocks 5, $5a$ having grooves $5b$ and $5c$, respectively, in which the rockers are journalled. The axes of the rockers and sockets are at right angles to the cable 1 so that unequal expansion and contraction of the limbs of the cable 1 on opposite sides of the rocker may be accommodated by a slight rocking motion of the rocker without necessitating slippage of the cable over the rocker. The pillow blocks are mounted in approved way on the piers 6.

The ends of the cable are held by suitable anchors 7 on the opposite shores of the channel A to be bridged; and there may be as many piers 6 as required or deemed expedient for the particular structure in hand.

The bands 2 are supported by shields 200 of boiler iron or low carbon steel plate of approved thickness bent to fit upon, and tightly compressed onto the cable wires by the bands. Yokes 8, 8′ are fitted upon the bands or on the outsides of the shields 200, within the judgment of the constructor, and the ends of the yokes are extended downwardly below the cable to form suspension limbs to support the lower structure of the bridge, and are of different lengths in alternation.

The shields are intended to support bands and yokes which transmit pressures, stresses and strains to the catenary cables.

The suspension limbs of alternate yokes 8 are spaced apart transversely of the bridge by suitable means as fillers 9 that may be of steel or other suitable material, and the yokes 8 are provided at their lower ends with hinge bolts 10 to which hangers 11 are swung. Said hangers are provided at their upper and lower ends with eyes 12 and 13, respectively, and the intermediate bodies 11 are preferably made of parallel wires in a manner corresponding to the catenary cables, and are provided with wire-end holders 14 to which the eyes 12 and 13 are fixed.

The eyes 13 support the load sustaining pivot bolts 15 on which are swung links formed by stirrups 16. The individual load carriers are supported by the stirrups and comprise floor sills 17 laid in such stirrups and beams supported by the sills and adapted to support flooring or railway rails. Said stirrups are provided above the sill with bolts 18 carried by upwardly divergent slanting suspension stays $e$, each composed of links 19 and 20 jointed together at 21.

22 and 23 are upper and lower double cantilever struts each consisting of a header as at $a, a'$, a center post $b$ and oblique limbs $c$.

These struts are shown as made up of metal plates doubled and constructed as trusses of a double cantilever character, the central posts $b$ and the header and limbs on opposite sides of the post $b$, forming the cantilever portions, affording bracket-like strength to resist deflection under vertical strains and also serving as struts to resist endwise thrusts.

The headers $a$ of the upper triadic truss beam struts 22 are provided at their ends with shoulder terminals $d$ that are loosely articulated with the yokes 8 or their fillers 9 to allow required lost motion and yet to apply, through the yokes, to the cable, an upward pressure at one point to compensate depressions at other points; and so on successively as a load progresses along the bridge.

The ends of the headers $a'$ of the truss beam struts are overlapped and are slotted as at $d'$ to accommodate connections of the direct hangers 11, and to be adjustable endwise relative to each other.

Referring to Fig. 4, it will be observed that depression of the right hand stirrup 16 will be directly transferred through bolt 15 and hanger 11, to depress the left end of the right hand yoke 8, and will be indirectly transmitted to the left through the adjacent one of the slanting stays $e$ and the left triadic limb $c$ and the left terminal of the beam 22 to depress the left hand yoke 8; and the depression of any stirrup is transmitted to the catenary through the direct hanger and yoke therefor, and also through the slanting stays $e$ at each side; and the load is thus distributed for a considerable distance along the catenary to yokes 8 and 8' and therethrough, to the cable.

The ends of the upper triadic truss cantilever rocking struts abut against the yokes 8 or fillers 9 to prevent displacement of the yokes lengthwise of the cable; but the lines of force reaching the articulation at $d$, are thus interrupted and dissipated. The open joints may allow for expansion and contraction and avoid the exertion of destructive compressions and strains from temperature changes and load variation.

A central bolt 24 connects the slanting stays of each individual load carrier to the inverted apex of the upper triadic truss-like struts of such carrier. The stirrups 16 are rigid, and a series of quadrangular carrier frames is formed below each catenary cable 1, each comprising yokes 8, 8', triadic truss-like struts 22, said stirrups 16, the pivot bolts 10, 18 and 24, the lower triadic truss-like struts 23 and the sills 17; so that each truss-like strut is measurably flexible in itself and is connected to its catenary cable and to all the other trusses under such cable, with such predetermined flexibility as may be deemed advisable, and to this end enough bolt holes and bolts of the character commonly used for such purpose, are employed.

The upper triadic truss-like struts are thus arranged in tandem throughout the length of the span, and the suspended trusses are likewise arranged in tandem, and a depression on any part of the sills is distributed through the stirrups, the hangers, the stays, the truss-like struts and the yokes, to the catenary cable throughout a considerable length of such cable.

25 indicates tie beams that are notched and slotted at their ends and thus provided with lugs 26 that rest upon the sills 17, and that embrace the stirrups 16, thus allowing freedom of movement such as may be necessary to take care of expansion and contraction, and to absorb vibration. Said tie beams are made of upper and lower members 27 and 28; the lower members 28 being channel irons provided with arched webs $f$ between two side walls $g$ and being secured to member 27 by bolts 29 extending through holes 30 in the side walls of said members, and by a bolt 31 extending through the web 32 of the member 27 and through holes 33, 33' in the webs 32 and $f$ of the two members. The ends of the arched web $f$ extends underneath the stirrups 16, and are supported by clips consisting of bars $h$ extending under the ends of the webs, and U bolts $i$ extending over the sides and through the bar $h$ and secured by nuts $j$.

The wires of the catenary cables are preferably separated by copper sheets 34; and the rocker 3 is provided with a recess 35 that is lined with a copper plate 36. The purpose of the copper sheets and the copper plate is to avoid friction and chafing of the wires upon each other or on the rocker.

The depending limbs of the yokes 8, are clamped together below the cable by U-clips 37 tightened against the limbs of the yoke by nuts 38.

39 indicates bands clamped upon the cable by U-clips 40 which support cross stays 41 that are connected transversely of the bridge to the catenary cables thus to hold such cables against swaying toward and from each other. Each of the suspension links 11, 19 and 20 is constructed of parallel wires, the ends of which extend through rings 42 over which such wires are bent as indicated in Figs. 18, and 20; and a spreader 43 is driven into the center void 44 to force the wires outwardly against the ring. The terminals 45 of the wires are bent over the ring end; and the cable end thus formed, together with the spreader, is seated in a sectional matrix 46 having shoulders 47 against which the ring 42 and the wire ends 48 abut.

The matrix 46 is divided longitudinally as indicated by the line 49 in Fig. 19 and the two halves are fitted upon their cable end and are secured by a threaded sleeve 50 which is tightly screwed onto the matrix so as to hold the halves of the matrix firmly in place, and to retain the enlarged head of the cable end.

Said matrix is provided with ears 51 having holes 52 for convenience of connection with their supports.

Wire wrapping indicated at 2a in Fig. 12, is of the usual type and encases the cables throughout when the bridge is fixed shut.

The limbs of the yokes may be held apart by spacing sleeves 54 on bolts 55 so that when the nuts are tightened on the bolts, the pressure thereof will be borne by the sleeve; and such sleeve is of such length that when the limbs of the yoke are brought tightly against the ends of the sleeve, the yoke will tightly clasp the sleeve upon the cable.

56 indicates railway rails on the cross ties and it is understood that said rails may be fastened to the cross ties by any well known means, not shown.

57 indicates the horizontal scenic promenade, footman's walk, bicycle path and dirigible trackless tram-way at the tops of the piers, supported by a comparatively light catenary 58 led over columns 59 at the tops of the piers in like manner as with the construction detailed in Figs. 15 and 16.

60 indicates approaches in the form of stairs or inclines leading from the ground to the top walk; and elevators as at 61 are provided for quick and easy ascent, and may have landings at the top and intermediate ways.

The piers 6 are indicated as being of massive masonry reinforced by steel structure which is not detailed in the drawings but is indicated by the steel columns 62.

Said piers are shown provided with lower intermediate and top adits 63, 64, 65 through which the traffic over the roadways is accommodated.

The lower adits 63 are below the level of the lowest or central limb 66 of the main catenary and the floor 67 of the lower roadway is at the level of said adit 63.

The intermediate adits 64 are practically at the level of said central or lower limb 66 of the main catenary and the top adit 65 is practically at the tops of the piers and between columns 59 that support the top catenary 58.

The floor constructions of the bridge may be of any well determined width and I have shown a construction in which four cables 1 are employed as the main catenary supporting the bridge floor 67 at the lower adit 63, each roadway being approximately 28 feet wide in the clear.

I claim:—

1. A bridge structure comprising a catenary and a suspension hung from the catenary; said suspension comprising individual load carriers, stirrups supporting said load carriers, hangers connecting the ends of the individual load carriers to the catenary, double cantilever trusses having articulating ends and pivotally connected to the catenary, and spacing the hangers apart along the catenary, and stays connecting the intermediate portion of the cantilevers respectively, to the intermediate portions of the stirrups.

2. The combination with a catenary; of intermediate and end supports connected to the catenary; a strut pivoted intermediate its ends to the intermediate support; a sill extending along beneath the catenary and the strut; stirrups supporting said sill; vertical hangers pivotally connected to the end supports and to the sill; and oblique hangers pivoted to the central portion of the strut and to the stirrups adjacent the lower ends of the vertical hangers.

3. In a bridge; a triadic suspension comprising a sill and intermediate and sill joint supports; triadic sets of suspension devices, each comprising a strut, a strut pivoting hanger, strut articulating hangers each of which is adapted and arranged to articulate with abutting ends of adjacent struts of a triad of suspensions; stirrups connecting the articulating hangers with the sill joint supports respectively; slanting stays connecting the central hanger of the triadic set with the sill joint supports of such set; a truss fixed to the sill joint supports and supported thereby, and a central sill support fixed to the truss and arranged to support the sill between the sill joint supports.

In testimony whereof, I have hereunto set my hand at Los Angeles, California, this 9th day of April, 1927.

ALLAN C. RUSH.